(12) United States Patent
Storm et al.

(10) Patent No.: US 8,772,695 B2
(45) Date of Patent: Jul. 8, 2014

(54) IMAGE SENSOR ARRANGEMENT

(75) Inventors: Graeme Storm, Forres (GB); Matthew Purcell, Edinburgh (GB); Derek Tolmie, Edinburgh (GB); John Kevin Moore, Edinburgh (GB); Michael Wigley, Edinburgh (GB)

(73) Assignee: STMicroelectronics (Research & Development) Limited, Buckinghamshire, Marlow (GB)

( * ) Notice: Subject to any disclaimer, the term of this patent is extended or adjusted under 35 U.S.C. 154(b) by 141 days.

(21) Appl. No.: 13/324,009

(22) Filed: Dec. 13, 2011
(Under 37 CFR 1.47)

(65) Prior Publication Data

US 2012/0312963 A1 Dec. 13, 2012

(30) Foreign Application Priority Data

Dec. 14, 2010 (GB) .................................. 1021144.9

(51) Int. Cl.
*H01L 21/00* (2006.01)
*H04N 3/14* (2006.01)

(52) U.S. Cl.
USPC ........................................ 250/208.1; 348/308

(58) Field of Classification Search
USPC ........................................ 250/208.1; 348/308
See application file for complete search history.

(56) References Cited

U.S. PATENT DOCUMENTS

| | | | |
|---|---|---|---|
| 6,885,396 B1 * | 4/2005 | Panicacci et al. | 348/241 |
| 2004/0046685 A1 | 3/2004 | Yun et al. | |
| 2006/0146155 A1 | 7/2006 | Shimizu | |
| 2007/0139544 A1 | 6/2007 | Egawa et al. | |
| 2008/0258042 A1 | 10/2008 | Krymski | |

OTHER PUBLICATIONS

UK Search Report for GB 1021144.9 mailed Apr. 14, 2011 (1 page).
International Search Report and Written Opinion for PCT/GB2011/052478 mailed Mar. 27, 2012 (11 pages).

* cited by examiner

*Primary Examiner* — Thanh Luu
(74) *Attorney, Agent, or Firm* — Gardere Wynne Sewell LLP

(57) ABSTRACT

Each column of pixels in an image sensor array has at least two column bitlines connected to an output of each pixel. A readout input circuit includes first inputs and a second input. Each first input is connected, via a capacitance, to a comparator input node. The second input is connected via a capacitance to the same comparator input node. The first inputs receive, in parallel, an analog signal acquired from the pixels via the column bitlines. The analog signals vary during a pixel readout period and have a first level during a first calibration period and a second level during a second read period with the analog signals being constantly read onto the capacitances during both the first calibration period and the second read period. The comparator compares an average of the signals on the plurality of first inputs to the reference signal.

21 Claims, 5 Drawing Sheets

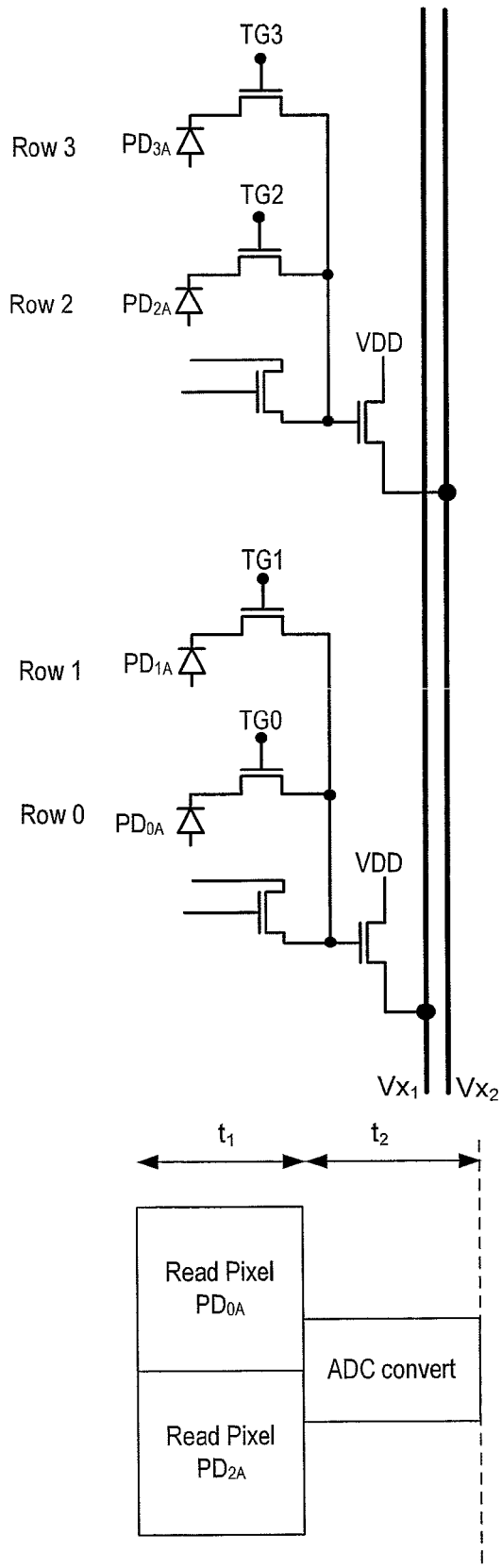

IMAGE SENSOR ARRANGEMENT

PRIORITY CLAIM

This application claims priority from United Kingdom Application for Patent No. 1021144.9 filed Dec. 14, 2010, the disclosure of which is hereby incorporated by reference.

TECHNICAL FIELD

This invention relates to pixel array circuitry for use in image sensors, such as those for use in mobile applications such as cameras and mobile phones. The invention also relates to devices, such as mobile phones, digital cameras and optical mice (computer pointing devices) incorporating solid state image sensors.

BACKGROUND

Image sensors using pinned photodiode pixels, typically implemented in CMOS architecture, are well known. Such image sensors in many applications have the advantage that both the image sensitive element and the image processing circuitry can be embodied in a single chip which can be manufactured using CMOS techniques.

A continuous time analog to digital converter architecture has been previously disclosed, for example, in European Patent 1956715, the disclosure of which is hereby incorporated by reference. However, such an architecture is not well suited for analog binning. Analog binning is a method of averaging or summing the data from multiple pixels into a single output. There is a need in the art to address this issue.

SUMMARY

In an aspect there is provided an image sensor comprising: a plurality of pixels arranged in rows and columns to form a pixel array, each pixel column comprising at least two column bitlines, such that an output of each pixel is connected to one of the column bitlines of the column of which it is comprised; a readout input circuit comprising a plurality of first inputs and a second input, each of said first inputs and said second input being connected via a capacitance to a single comparator input node; and a readout comparator circuit connected to said single comparator input node; wherein the readout input circuit is operable such that each of said first inputs receives, in parallel, an analog signal, said analog signals being acquired from the signal output of one or more of said pixels via the column bitline to which the pixel is connected, said analog signals varying during a pixel readout period and having a first level during a first calibration period and a second level during a second read period, said readout input circuit being further operable such that said analog signals at said first inputs and a reference signal from a time varying reference circuit on said second input are constantly read onto their respective capacitances during both the first calibration period and the second read period; and wherein said readout comparator circuit is operable to compare an average of the signals on each of said plurality of first inputs to said reference signal.

BRIEF DESCRIPTION OF THE DRAWINGS

Embodiments of the invention will now be described, by way of example only, by reference to the accompanying drawings, in which:

FIGS. 5a and 5b shows a two bitline per column architecture and the timing of a corresponding two pixel read and convert operation;

DETAILED DESCRIPTION OF THE DRAWINGS

Figure 1:
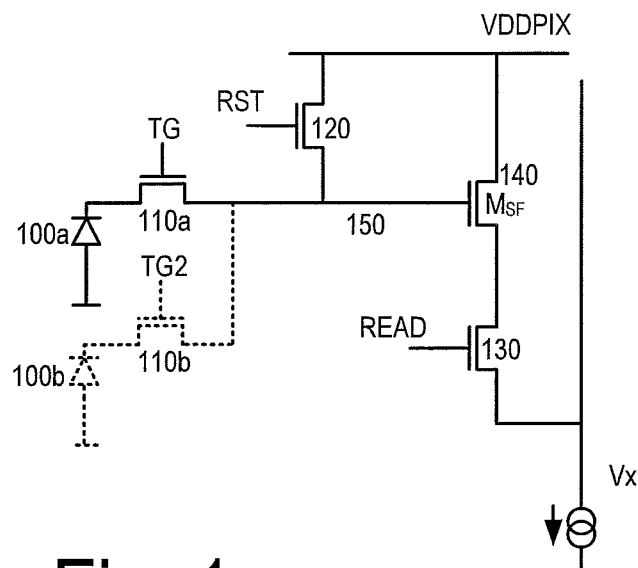
FIG. 1 shows a common 4-transistor pixel structure.

FIG. 1 shows a common pixel architecture, based on what is known as a 4T pixel. There are four transistors 110a, 120, 130, 140 (hence 4T) and a photodiode element 100a. These transistors act to reset, expose, and then readout data from the structure. They comprise a transfer gate transistor 110a, controlled by signal TG, a reset transistor 120, controlled by signal RST, a readout transistor 130, controlled by signal READ, and a source follower transistor 140, with gate tied to a sense node 150.

To improve the area used for light collection, it is also common to share photodiode structures with the same readout. The case where two photodiode structures share a single readout is also shown in FIG. 1 (dotted, noting the extra transfer transistor 110b required for each extra photodiode 100b). Although this method increases the light sensing area it also increases the capacitance on the sense node and thus reduces the conversion factor of the pixel. Further increases to the light sensing area can be achieved by removing the READ device. In this case the sense nodes need to be set low to turn off the source follower device while other rows are being addressed and readout.

In addition to optimization of the light sensing silicon area, it is important to ensure the incident illumination gets to the photodiode area. Until recently, the majority of devices used what is known as a Front Sided illuminated structure (FSI). In these devices, incident illumination must pass between the holes in the metal stack structure of the image sensor. It was thus advantageous for such devices to have a minimum number of metal layers above the imaging plane.

Figure 2:
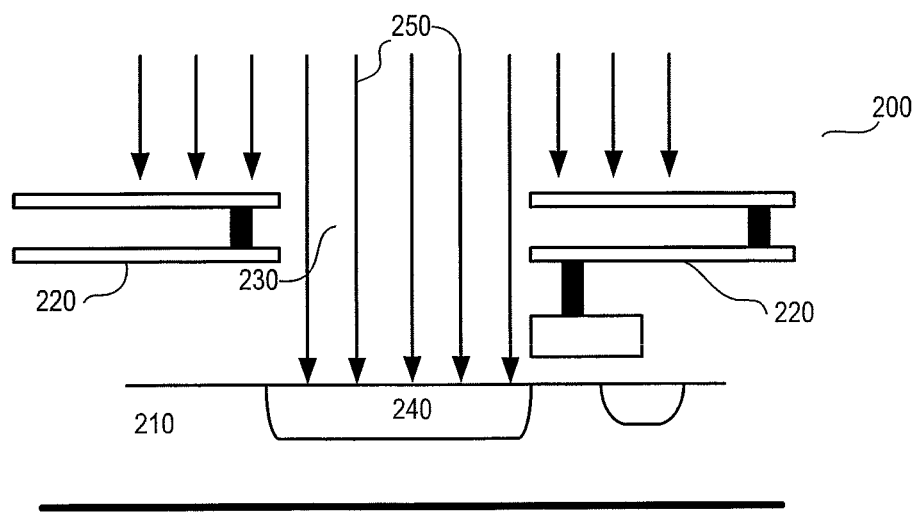
FIG. 2 illustrates the drawbacks of Front-Sided Illumination pixel structures.

FIG. 2 illustrates such a Front Sided illuminated structure (FSI). It shows a pixel structure 200 comprising a pixel substrate 210. Above the pixel substrate 210 is the metal stack 220, comprising the power lines and circuit connections. Holes 230 are provided in the metal stack above the photodiode 240 to allow photons through, and onto the photodiode 240 (illustrated by light rays 250), so that they can be counted.

More recently, devices are now being fabricated where the sensor is illuminated from the back side. Such sensors are known as Back-side illuminated (BSI) sensors. Such a sensor obviously requires extra dedicated process steps (such as thinning of the substrate) to achieve the light collection desired. The move to a BSI sensor relaxes the restrictions on metal routing in the stack above the pixel and photodiode element (although not removing all restrictions).

Pixels as illustrated in FIG. 1 typically operate with a pinned photodiode structure and Correlated Double Sampling (CDS) to remove "kT/C" noise associated with the reset operation. In Correlated Double Sampling, the output of the sensor is measured twice (via the line Vx): once in a known condition (in this case at "black level" when the only level change is resultant from noise) and once in an unknown condition (signal level, which still includes the "black level" noise). The value measured from the known condition is then subtracted from the unknown condition so as to remove the "black level" noise offset.

Conventionally this was done using a sample and hold circuit to perform the double sampling. However, the sample and hold capacitors were themselves a source of kT/C noise. This kT/C noise means that to halve the noise, capacitor size is required to increase fourfold. As such, size or noise limits are placed on the design of the image sensor.

To address this, a continuous time analog to digital converter (ADC) architecture has been developed. Reference is made to the architectures disclosed in European Patent 1956715, European Patent 2104234 or U.S. application Ser. No. 12/622,373, all of which are incorporated herein by reference, and will now be described briefly.

By using a continuous time arrangement, the kT/C noise of the sample capacitors, C1 and C2, is mitigated by removing the requirement to hold. That is, the capacitors C1 and C2 are continuously connected to the ramp generator and line VX, respectively, and, as such, there is a less kT/C noise generated than if a hold operation was performed. This allows capacitors C1 and C2 to be reduced in size.

In such a continuous time sensor ADC arrangement, the image sensor has a per-column ADC including first and second capacitors. The capacitors are continuously connected to, respectively, the analog pixel signal and a ramp signal without use of a hold operation.

Figure 3:
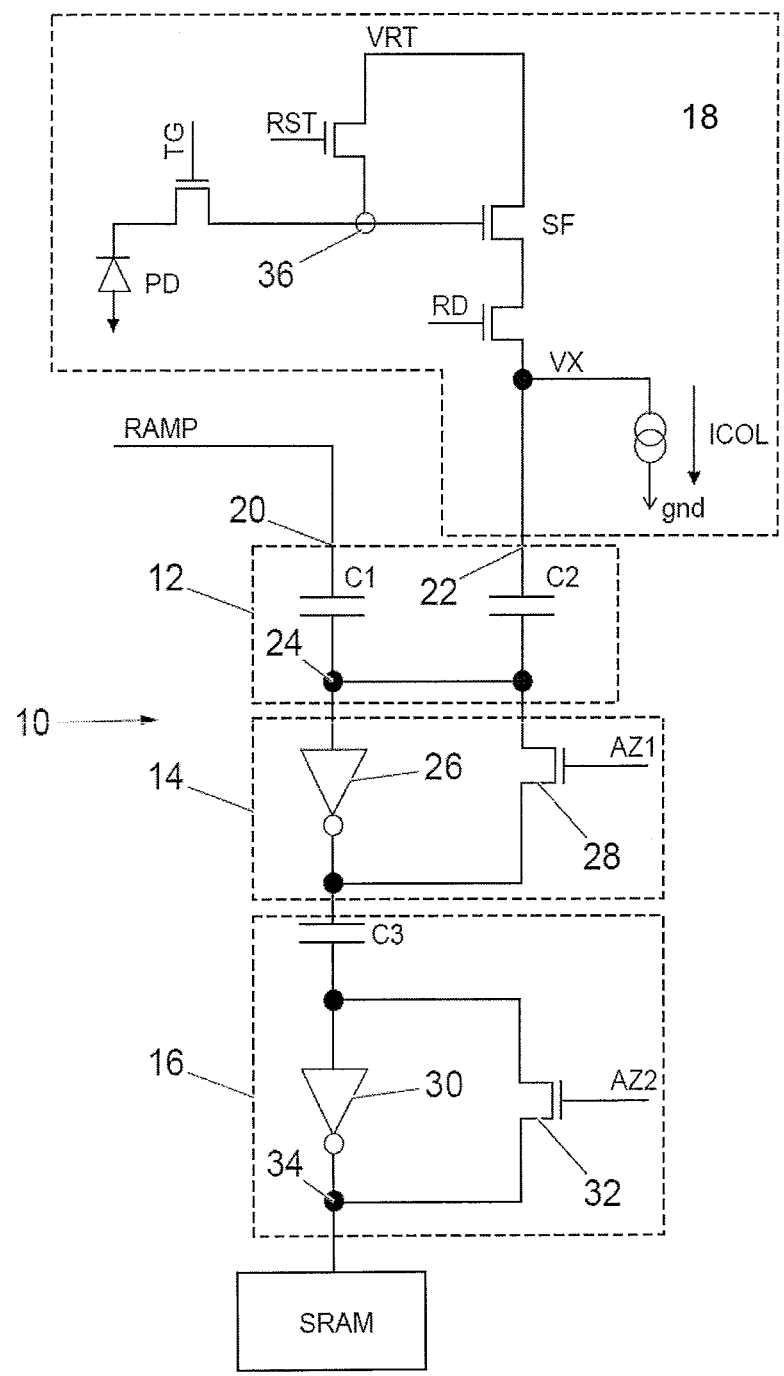
FIG. 3 shows a continuous time analog to digital converter (ADC) architecture.

FIG. 3 shows an example of such a continuous time ADC 10, which comprises an input circuit 12 and a comparator, the comparator comprises an inverter circuit 14 and an output circuit 16. The input 22 to the input circuit 12 is from the column output line of a pixel array, one pixel 18 being shown by way of example.

The input circuit 12 comprises a first capacitor C1 connected to a first input 20 and a second capacitor C2 connected to a second input 22. The first input 20 is connected to a ramp generator, which generates an appropriate time varying reference signal RAMP when required by the control means. The value of the time varying reference signal being known by the control means at any given time. The second input 22 is connected to the output of the pixel 18. The first and second capacitors C1, C2 are also connected to the input circuit's output node 24. The input circuit 12 obtains results similar to correlated double sampling by zeroing the black pixel value.

The inverter circuit 14, comprises a first inverter 26 and, on a feedback loop from the output of the first inverter 26, a first transistor 28. The first transistor 28, in this instance, operates as a switch and is activated by an autozero signal AZ1 from the control means.

The output circuit 16 comprises a third capacitor C3, connected to the output of the inverter circuit 14, a second inverter 30 and, on a feedback loop from the output of the second inverter 30, a second transistor 32. The second transistor 32, in this instance, operates as a switch and is activated by an autozero signal AZ2 from the control means. The output circuit 16 stores the value of the pixel 18 in a memory SRAM.

The comparator (inverter circuit 14 and an output circuit 16) can be described as a summing comparator, in that it adds the two input values RAMP and VX. If RAMP+VX is greater than zero, the output of the comparator goes high, and, if RAMP+VX is less than zero, the output of the comparator goes low, where zero for RAMP is set to be the value of RAMP when VX(black) is measured and zero for VX is VX(black). Consequently when the signal measurement is being made (TG goes high), signal VX falls from the value VX(black) to a new value, VX(signal) representative of the pixel output. The ramp signal RAMP, which has been zeroed when VX equals VX(black), begins to ramp up until RAMP+VX equals zero, setting the output of the comparator high and therefore causing the digital equivalent of the signal RAMP to be stored in SRAM, this being the equivalent of VX(black)−VX(signal).

A known method of improving frame rate is analog binning. This is a method of averaging or summing the data from multiple pixels into a single output (it can also be known as Bayer Scaling in color devices when pixels of the same color plane in the Bayer pattern are combined). Analog binning is commonly used to display an image in viewfinder mode in a mobile phone or DSC. Analog Binning aims to improve the signal to noise ratio by reducing the noise contribution through averaging. Averaging can be performed in the digital domain however no improvement is made to the frame rate by using this method.

Figure 4A:
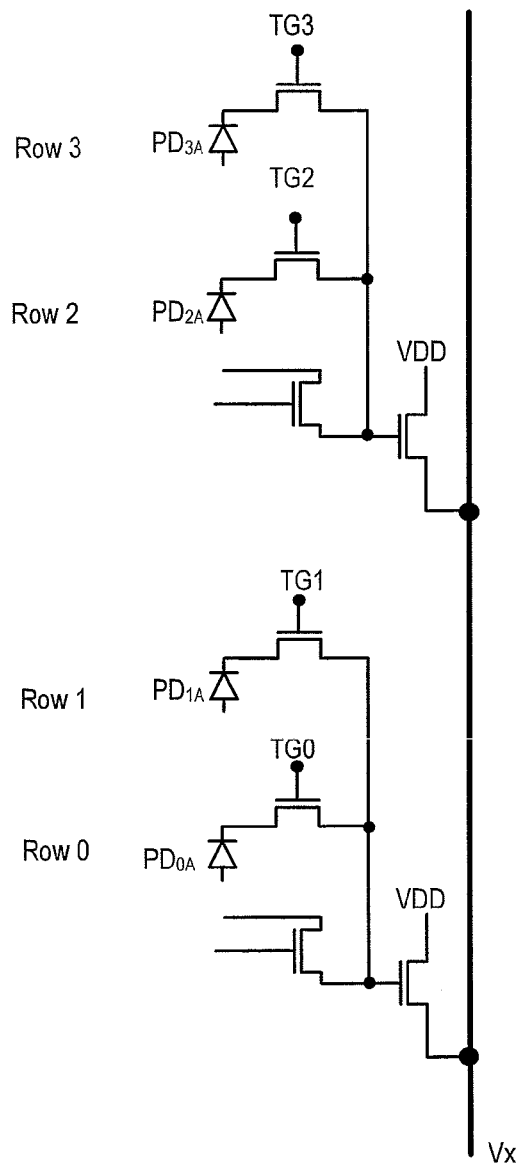
FIGS. 4a and 4b shows a conventional single bitline per column architecture and the timing of a corresponding two pixel read and convert operation.
Figure 4B:
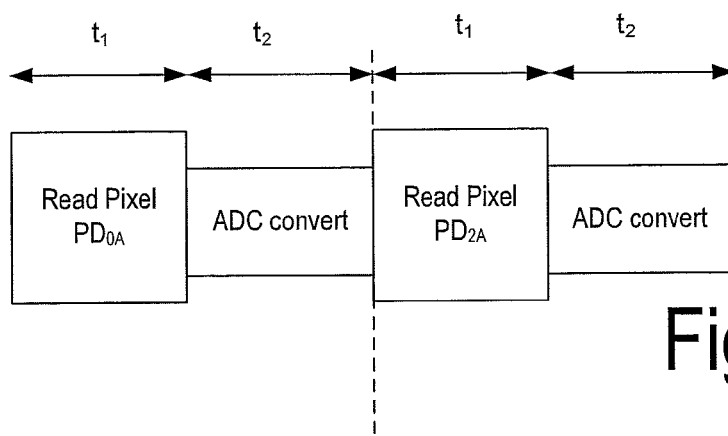

The a continuous time ADC described in relation to FIG. 3 above is not well suited to analog binning. This is illustrated by FIGS. 4a and 4b. FIG. 4a shows a conventional pixel readout structure comprising 4 rows all of which are accessed via the same column bitline Vx. Since they share the same column bitline Vx, should it be desired to "bin" together, that is combine, the pixel data from Row 0 and Row 2 (photodiodes $PD_{0A}$ and $PD_{2A}$), it is required to access each row sequentially. When a continuous time readout is used, two separate reads and two ADC conversions are required, as illustrated by the timing diagram of FIG. 4b. As can be seen, the total time for this operation is time $2(t_1+t_2)$. This means that no improvement of the frame rate is obtained.

FIGS. 5a and 5b illustrate how an improvement in frame rate can be obtained by analog binning using the continuous time ADC architecture. This is achieved by adding an extra column bitline $Vx_2$ for each readout column. The ability to include an extra bitline per column is made more practical by the existence of Back-side illuminated (BSI) sensors as previously described, and in particular the consequent relaxation of the restrictions on metal routing in the stack above the pixel.

The extra column bitline $Vx_2$ permits data to be readout from two rows concurrently and thus improve throughput of the device. FIG. 5b illustrates the improved timing. It can be seen that the time taken for the same operation (read Row 0 and Row 2 and convert) is approximately half of the time taken in the FIG. 4 example, that is time $t_1+t_2$, thereby providing for an effective doubling of the frame rate. To achieve this, analog binning is performed, whereby data from the two read pixels $PD_{0A}$, $PD_{2A}$ is averaged together. This is performed throughout the array so as to create an output image of a reduced resolution compared to the full array. This method has the advantage that it will average the source follower noise from the pixels being binned.

Figure 6:
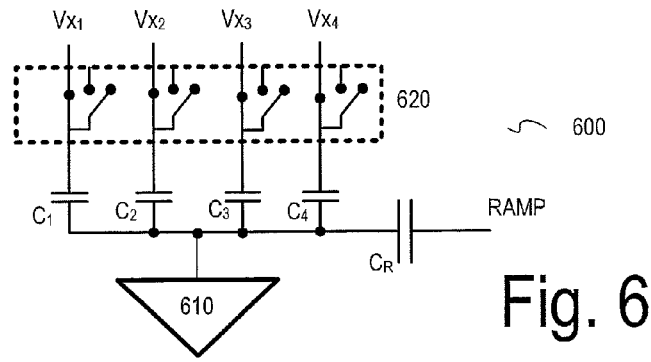
FIG. 6 shows the input stage of a continuous time analog to digital converter adapted for analog binning using multiple bitlines.

FIG. 6 shows how the input stage of the continuous time ADC can be adapted to handle multiple column inputs. The abovementioned increase in frame rate can only be realized if the column ADC is capable of handling the increased number of inputs while operating in continuous time mode. To do this the number of input capacitors needs to be increased.

The input stage of the continuous time ADC 600 of FIG. 6 comprises inputs for four Vx lines $Vx_1$-$Vx_4$. Each input feeds into an input capacitor $C_1$-$C_4$. These capacitors take the place of input capacitor C2 of FIG. 3. As before there is a ramp capacitor $C_R$ (equivalent to C1 of FIG. 3) and an input for a ramp signal RAMP. Also shown is a switch matrix 620 which is used to select between the different columns of the sensor array. Switches are required to allow the sensor to operate in a full resolution mode and a binning mode. It should be appreciated that the switches do not perform any sampling, they only connect the appropriate column (and that one of the inputs can be continuously connected to a Vx line, thereby dispensing with one of the switches). The rest of the continuous time ADC is essentially the same as that depicted in FIG. 3, from node 24 down.

To operate in full resolution mode, switch matrix 620 connects each input capacitor $C_1$-$C_4$ to the same single column. In one embodiment the capacitance of each input capacitor $C_1$-$C_4$ is a quarter (or more generally, the reciprocal of the number of inputs) of the capacitance of ramp capacitor $C_R$. This means that, when operating in full resolution mode, the continuous time ADC 600 of FIG. 6 operates exactly the same way, and has an equivalent structure, to the continuous time ADC 10 of FIG. 3, when the capacitance of C1 equals that of C2. Of course, the ratio of the input capacitance resulting from the capacitors $C_1$-$C_4$ to that of the ramp capacitance $C_R$ can be made to be anything other than 1:1 and, as such, will dictate the equivalent voltage of a single code in the final image.

Figure 7:
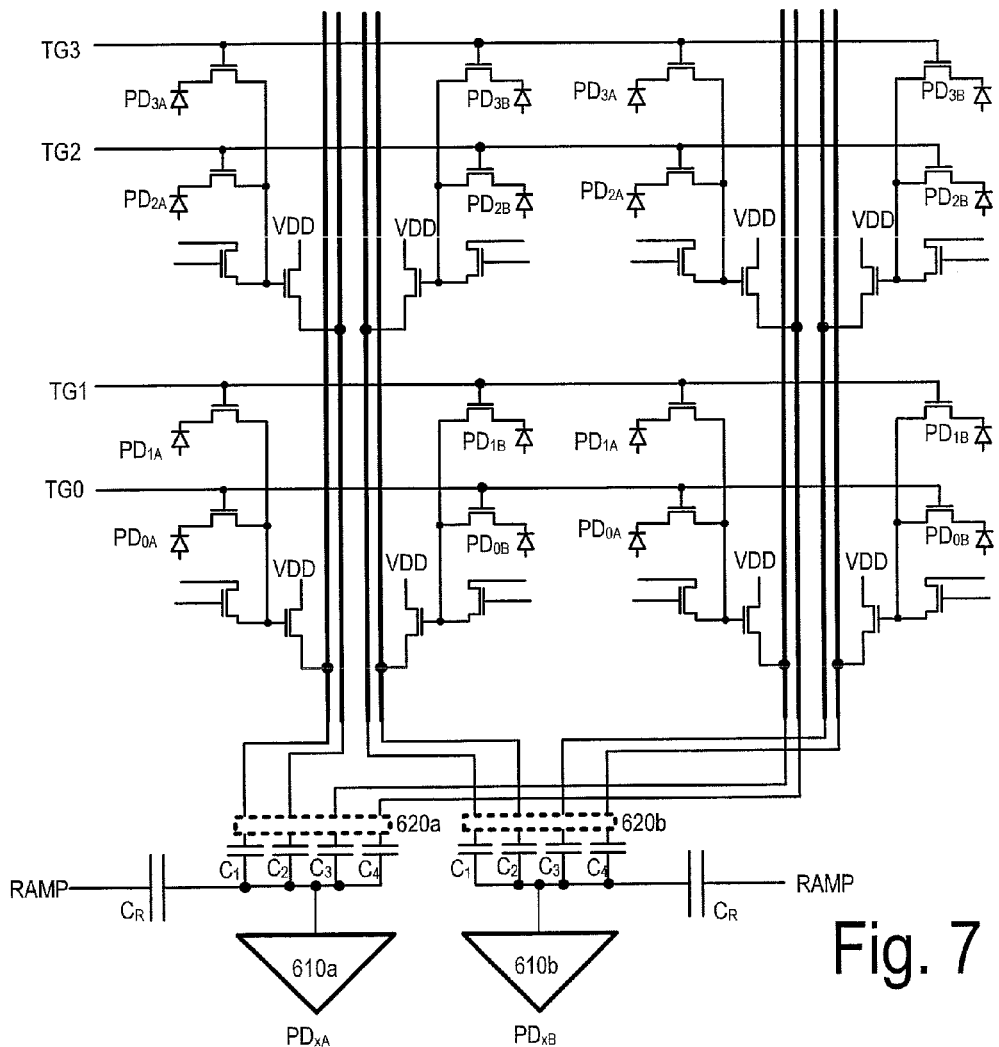
FIG. 7 shows part of a full pixel array with analog binning readout arrangement.

FIG. 7 shows four input capacitors connected to 4 different columns, for each of two continuous time ADCs 610. For operation in a binning mode it is required for the switch matrices 620a and 620b to connect different columns to the input capacitors $C_1$-$C_4$. In the example of FIG. 7 the first ADC 610a averages the data from pixels $PD_{0A}$, $PD_{1A}$, $PD_{2A}$, $PD_{3A}$ and the second ADC 610b averages the data from pixels $PD_{0B}$, $PD_{1B}$, $PD_{2B}$, $PD_{3B}$, prior to conversion. It should be appreciated that these pixels are not all averaged at the same time. For conventional binning in a color image the pixels $PD_{0A}$ and $PD_{2A}$ would be averaged together (this assumes TG0 and TG2 pulse at the same time to transfer data from the 4 pixels). $PD_{1A}$ and $PD_{3A}$ would be averaged by pulsing TG1 and TG3. The same applies to the $PD_{XB}$ pixels.

It is also envisaged that the input stage can comprise more or fewer capacitors with the switch matrix able to vary the amount of columns to be averaged (or binned) as desired, or to apply different weighting to the different columns. For example, if one of the columns is connected to more than one input capacitor, its effect on the final average will be higher than a column connected to only one capacitor. By giving a higher or lower weighting to some pixels prior to averaging can improve the final resolution of the image. Weighting can also be altered by selection of appropriate capacitor sizes between different columns connected to the same continuous time ADC, such that some pixels have more or less weighting in the final image. By providing a selection of capacitors, and/or switching arrangements for the input capacitors, the weighting may be controllable by selecting the appropriate capacitances using the switch matrix to select a particular capacitor or combination of capacitors for each input. Finally, as mentioned previously in relation to the full resolution mode, but equally applicable to the analog binning mode, the ratio of input capacitance resulting from the capacitors $C_1$-$C_4$ to that of the ramp capacitance $C_R$ dictates the equivalent voltage of one code in the final image.

The above embodiments are described by way of example only, and there are many different embodiment and variations which may be envisaged that fall within the spirit and scope of the invention.

What is claimed is:

1. An image sensor, comprising:
  a plurality of pixels arranged in rows and columns to form a pixel array, each pixel column comprising at least two column bitlines, such that an output of each pixel is connected to one of the column bitlines of the column of which it is comprised;
  a readout input circuit comprising a plurality of first inputs and a second input, each of said first inputs and said second input being connected via a capacitance to a single comparator input node; and
  a readout comparator circuit connected to said single comparator input node,
  wherein the readout input circuit is operable such that each of said first inputs receives, in parallel, an analog signal, said analog signals being acquired from the signal output of one or more of said pixels via the column bitline to which the pixel is connected, said analog signals varying during a pixel readout period and having a first level during a first calibration period and a second level during a second read period;
  said readout input circuit being further operable such that said analog signals at said first inputs and a reference signal from a time varying reference circuit on said second input are constantly read onto their respective capacitances during both the first calibration period and the second read period; and
  wherein said readout comparator circuit is operable to compare an average of the signals on each of said plurality of first inputs to said reference signal.

2. The image sensor as claimed in claim 1 wherein the readout comparator circuit output changes when said time varying reference signal corresponds to the level held on said capacitances on said first inputs, said level being equivalent to the difference of the average of the signals after said second read period and the average of the signals after said first calibration period, said image sensor being further operable to store a digital value corresponding to the reference signal level at the time said readout comparator circuit output changes, thereby converting said average to a digital value.

3. The image sensor as claimed in claim 1 further comprising a switch network to selectively connect said first inputs to one or more bitlines.

4. The image sensor as claimed in claim 1, operable in two main modes, a first mode whereby all of said first inputs are connected to a single bitline such that all of said analog signals are acquired from a single pixel, and a second mode whereby at least two of the first inputs are connected to different bitlines, such that said analog signals include those acquired from a plurality of pixels.

5. The image sensor as claimed in claim 4 wherein said second mode allows two or more bitlines to be connected to a single input, so as to allow weighting of said average.

6. The image sensor as claimed in claim 1 wherein the capacitances on each of said first inputs are equal.

7. The image sensor as claimed in claim 1 wherein the capacitances on at least one of said first inputs are made variable, so as to allow weighting of said average.

8. The image sensor as claimed in claim 1 wherein the ratio of the combined capacitance on said first inputs to the capacitance on said second input is made variable, to vary the scale of the comparator circuit output.

9. The image sensor as claimed in claim 1 wherein the outputs of said pixels are substantially shared between said column bitlines.

10. The image sensor as claimed in claim 1 comprised as a back-sided illumination structure.

11. The image sensor as claimed in claim 1 wherein said readout comparator circuit comprises at least first and second inverter circuits in series each having a selectively connectable feedback loop, said image sensor being operable such that during said first calibration period said selectively connectable feedback loops of said first and second inverter circuits are disconnected sequentially, and such that said time varying reference circuit begins providing said ramping signal at the same time before each disconnection.

12. The image sensor as claimed in claim 11 wherein the readout comparator circuit further comprises an output capacitor.

13. The image sensor as claimed in claim 12 operable such that said sequential disconnection of the first and second feedback loops allows for the sampling of offset voltages resultant from thermal noise from the pixel, and readout comparator circuit such that the analog signal can be appropriately corrected.

14. The image sensor as claimed in claim 13, wherein said sequential disconnection of the first and second feedback loops results in an input offset of said second inverter circuit being sampled onto a first plate of the output capacitor and thermal noise from the first inverter circuit being sampled onto a second plate of said output capacitor.

15. The image sensor as claimed in claim 14, wherein said disconnection of the second feedback loop results in thermal noise from the second inverter circuit being sampled onto the output capacitor.

16. The image sensor as claimed in claim 1 wherein the readout comparator circuit comprises a differential input for said combination of the analog pixel signals and the time variant reference signal, said differential input being biased by a fixed reference signal.

17. An image sensor, comprising:
a first pixel in a first row;
a first column bitline;
a first circuit coupling the first pixel to the first column bitline;
a second pixel in a second row, wherein the first and second pixels are in a same column;
a second column bitline;
a second circuit coupling the second pixel to the second column bitline;
wherein the first and second column bitlines are provided for said same column;
a comparator circuit having an input;
a first transfer capacitance coupled between the first and second column bitlines and the comparator input;
a second transfer capacitance coupled between the first and second column bitlines and the comparator input; and
a ramp capacitance coupled between a ramp signal node and the comparator input.

18. The image sensor of claim 17 further comprising a switching circuit coupled between the first and second column bitlines and the first and second transfer capacitances.

19. An image sensor comprising:
a first pixel in a first row;
a first column bitline;
a first circuit coupling the first pixel to the first column bitline;
a second pixel in a second row;
a second column bitline;
a second circuit coupling the second pixel to the second column bitline;
a comparator circuit having an input;
a first transfer capacitance coupled between the first and second column bitlines and the comparator input;
a second transfer capacitance coupled between the first and second column bitlines and the comparator input;
a ramp capacitance coupled between a ramp signal node and the comparator input; and
a switching circuit coupled between the first and second column bitlines and the first and second transfer capacitances;
wherein the switching circuit is operable in a first mode wherein the first and second column bitlines are coupled to a same one of the first and second transfer capacitances, and
wherein the switching circuit is further operable in a second mode wherein the first column bitline is coupled to the first transfer capacitance and the second column bitline is coupled to the second transfer capacitance.

20. An image sensor, comprising:
a pixel array including a pixel column comprising at least two column bitlines;
a readout input circuit comprising a plurality of first inputs and a second input, and including a capacitance coupled between each first input and a single comparator input node and a capacitance coupled between the second input and the single comparator input node;
a switching circuit coupled between the two column bitlines and the plurality of first inputs, said switching circuit operable in a first mode supporting a full resolution operating mode and a second binning operating mode; and
a readout comparator circuit connected to said single comparator input node.

21. An image sensor, comprising:
a pixel array including a pixel column comprising at least two column bitlines;
a readout input circuit comprising a plurality of first inputs and a second input, and including a capacitance coupled between each first input and a single comparator input node and a capacitance coupled between the second input and the single comparator input node;
a switching circuit coupled between the two column bitlines and the plurality of first inputs, said switching circuit operable in a first mode supporting a full resolution operating mode and a second binning operating mode; and
a readout comparator circuit connected to said single comparator input node;
wherein in the first mode supporting a full resolution operating mode the switching circuit is operable to couple the first and second column bitlines to a same one of the plurality of first inputs, and wherein in the second binning operating mode the switching circuit is operable to couple the first and second column bit lines to different ones of the plurality of first inputs.

* * * * *